(12) United States Patent
Kurihara et al.

(10) Patent No.: US 7,039,490 B2
(45) Date of Patent: May 2, 2006

(54) CONTROLLER FOR WIRE ELECTRIC DISCHARGE MACHINE

(75) Inventors: Masaki Kurihara, Tokyo (JP); Kaoru Hiraga, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/803,117

(22) Filed: Mar. 18, 2004

(65) Prior Publication Data

US 2004/0193306 A1    Sep. 30, 2004

(30) Foreign Application Priority Data

Mar. 24, 2003    (JP) ............................... 2003-079935

(51) Int. Cl.
G06F 19/00    (2006.01)
(52) U.S. Cl. ..................................... 700/162
(58) Field of Classification Search ................ 700/162, 700/172, 170, 173, 174; 219/68, 69.1, 69.11–69, 219/70, 71, 69.12, 69.15
See application file for complete search history.

(56) References Cited

U.S. PATENT DOCUMENTS

| | | | | |
|---|---|---|---|---|
| 3,705,286 A | * | 12/1972 | Kondo et al. | 219/69.13 |
| 3,999,028 A | * | 12/1976 | Saito et al. | 219/69.17 |
| 4,081,652 A | * | 3/1978 | Janicke et al. | 219/69.12 |
| 4,335,436 A | * | 6/1982 | Inoue | 700/162 |
| 4,392,041 A | | 7/1983 | Yatomi et al. | 219/69.12 |
| 4,709,131 A | * | 11/1987 | Del Bello et al. | 219/69.17 |
| 5,689,427 A | | 11/1997 | Li et al. | 700/162 |
| 5,756,954 A | * | 5/1998 | Kamiguchi et al. | 219/69.12 |
| 5,756,956 A | * | 5/1998 | Sato et al. | 219/69.18 |
| 5,841,093 A | * | 11/1998 | Wada | 219/69.17 |
| 6,208,150 B1 | * | 3/2001 | Akamatsu | 324/678 |
| 6,278,075 B1 | * | 8/2001 | Kamiguchi et al. | 219/69.12 |

FOREIGN PATENT DOCUMENTS

| | | |
|---|---|---|
| EP | 0 934 791 A2 | 8/1999 |
| JP | 62-292317 | 12/1987 |

OTHER PUBLICATIONS

Search Report for corresponding EP Application EP 04 25 1666 mailed Jul. 19, 2004.
Notice of Grounds for Rejection (Office Action) dated Aug. 2, 2005 with an English translation.

* cited by examiner

Primary Examiner—Leo Picard
Assistant Examiner—Chad Rapp
(74) Attorney, Agent, or Firm—Staas & Halsey LLP

(57) ABSTRACT

A controller for a wire electric discharge machine which can achieve stable machining with high surface accuracy without requiring adjustment of a gain or the like in wire-electrode feed control. A discharge gap detection unit detects a voltage between a wire electrode and a workpiece. An amount-of-machining-per-unit-distance change detection unit obtains an average machining voltage, and a voltage drop $E_X$ that is a difference between the obtained average machining voltage and a no-load voltage. A comparative determination unit obtains a ratio $E_S/E_X$ between a reference voltage drop $E_S$ stored in a reference-amount-of-machining-per-unit-distance relative value storage unit and the drop voltage $E_X$. A feed pulse arithmetic unit obtains a feed speed that makes the amount of machining per unit time constant, on the basis of the ratio $E_S/E_X$ and a predetermined feed speed, and distributes feed pulses to motors to thereby move the wire electrode relatively to the workpiece. Since the amount of machining per unit time is kept constant, the surface accuracy in finishing is high and stable machining can be performed.

12 Claims, 8 Drawing Sheets

Gs , Gx : WIDTH OF PORTION TO BE REMOVED

Vx , Vs : AVERAGE MACHINING VOLTAGE

Vo : NO LOAD VOLTAGE

Vs < Vx IN THIS CASE $\delta s$ : REFERENCE MOTION AMOUNT PER UNIT TIME $\delta x$ : MOTION AMOUNT PER UNIT TIME
$= \delta s * (Vo - Vs) / (Vo - Vx)$ t : THICKNESS S: AREA OF ELECTRIC DISCHARGE $\propto G \times t$ Gx  G(x+1)  : WIDTH OF PORTION TO BE REMOVED Vx, V(x+1)  : AVERAGE MACHINING VOLTAGE V(x) < V(x+1) IN THIS CASE Vs  : REFERENCE VOLTAGE $\delta x$  : MOTION AMOUNT PER UNIT TIME = (Vx − Vs) ∗ GAIN $\delta (x+1)$ : MOTION AMOUNT PER UNIT TIME = (V(x+1) − Vs) ∗ GAIN t  : THICKNESS Gx, G(x+1) : WIDTH OF PART TO BE REMOVED Vx, V(x+1) : AVERAGE MACHINING VOLTAGE V(x+1) < V(x) IN THIS CASE

δ : MOTION AMOUNT PER UNIT TIME t : THICKNESS

CONTROLLER FOR WIRE ELECTRIC DISCHARGE MACHINE

BACKGROUND OF THE INVENTION

1. Field of the Invention

The invention relates to a controller for a wire electric discharge machine, specifically a controller for a wire electric discharge machine suitable for finishing in electric discharge machining.

2. Description of the Related Art

FIG. 10 is a block diagram showing parts relevant to feed control in a conventional wire electric discharge machine. A discharge pulse generator 1 is for applying a discharge pulse voltage to a gap between a wire electrode 4 and a workpiece 5 for electric discharge machining, and comprises a direct-current power source, a circuit including a switching element such as a transistor, a charge and discharge circuit for a capacitor, and others. Conductive brushes 2 and 3 are for making a current flow through the wire electrode, and connected to one of the two terminals of the discharge pulse generator 1. The workpiece 5 is connected to the other terminal of the discharge pulse generator 1. The discharge pulse generator 1 applies a pulse voltage between the wire electrode 4, which is traveling, and the workpiece 5.

A discharge gap detection unit 6 is connected to the wire electrode 4 and the workpiece 5. The discharge gap detection unit 6 detects a pulse-like gap voltage of a length of about several microseconds from the discharge pulse generator 1. The detected voltage value is processed by an averaging circuit 21 for adjustment to the processing speed of a feed pulse arithmetic unit, and compared with an output of a reference voltage setting unit 22 to thereby obtain a voltage deviation. On the basis of the obtained voltage deviation, the feed pulse calculation unit 13 generates a pulse train having a controlled pulse interval, and sends the pulse train to a feed pulse distribution unit 12. The feed pulse distribution unit 12 divides this pulse train into drive pulses for an X-axis and drive pulses for a Y-axis according to machining programs, and sends the drive pulses to an X-axis motor control unit 10 and a Y-axis motor control unit 11 for driving a table on which the workpiece 5 is placed.

When the workpiece 5 and the wire electrode 4 comes close enough to each other to produce electric discharge, a discharge pulse current flows from the discharge pulse generator 1 and electric discharge starts. After the electric discharge, an appropriate off time is taken so that the gap is cooled. Then, the discharge pulse voltage is applied again. By repeating this operation cycle, electric discharge machining is performed, where each time the discharge pulse is generated, a part of the workpiece 5 is removed. The detected gap voltage is processed in the averaging circuit 21, and compared with an output of the reference voltage setting unit 22 to obtain a voltage deviation. In the feed pulse calculation unit 13, a speed command value is obtained by multiplying the voltage deviation by a gain that is determined separately. When the average machining voltage is higher than the reference voltage value and the deviation from the reference voltage value is large, it is determined that the gap is becoming larger, and the feed speed is increased. When the average machining voltage decreases and the deviation decreases, it is determined that the gap is becoming narrower, and the feed speed is decreased. When the average machining voltage is equal to the reference voltage value and the deviation is zero, feed control is so performed that the feed speed will be zero. This means that the feed speed control is so performed that the machining voltage will come close to a fixed value. If the average machining voltage is lower than a predetermined voltage value, it is determined that there is a short circuit, and steps such as stopping the application of the discharge pulse voltage and following the track backward are taken.

There is known another feed control mode in which when the average machining voltage is equal to the reference voltage value, the feed speed is set at a predetermined reference feed speed. When the average machining voltage is higher than the reference voltage value, the feed speed is set at a speed higher than the reference feed speed. When the average machining voltage is lower than the reference voltage value, the feed speed is set at a speed lower than the reference feted speed.

An invention in which the above-described two feed control modes are applied to roughing (first cutting) and finishing, separately, to improve surface roughness is also known (see JP 3231567B). In this invention, in first cutting where a contour is first cut, a mode is taken in which when the voltage difference is zero, feed is stopped, and when the voltage difference is reversed, feed is reversed. In finishing, a mode is taken in which when the average machining voltage is equal to the reference voltage value and the voltage difference is zero, the feed speed is set at a predetermined feed speed. Thus, the gain in finishing is made smaller than the gain in intermediate finishing. Specifically, in the mode in which the feed speed is set-at zero when the voltage difference is zero, the feed speed corresponding to an appropriate machining voltage changes when the gain is changed. Thus, by shifting the feed speed from zero, which corresponds to the voltage difference of zero on the average machining voltage versus feed speed gain curve, to a predetermined speed, the gain is lowered to improve the surface roughness.

Any of the above-mentioned modes, that is, the mode in which the feed speed is set at zero when the voltage difference between the average machining voltage and the reference voltage is zero, the mode in which the feed speed is set at a predetermined feed speed when the voltage difference is zero, and the mode in which these two modes are combined is feed control in a constant average machining voltage mode.

Besides this control mode, a constant feed speed mode in which the feed speed is simply kept at a predetermined speed is also known.

The constant average machining voltage mode is originally intended to improve the speed of first cutting in which a contour of a workpiece is first cut, and prevent breaking of a wire due to electric discharge concentration. Hence, when the constant average machining voltage mode is used in finishing, namely second and subsequent cutting in which electric discharge machining is performed using a smaller discharge pulse current in order to improve surface roughness and accuracy after the first cutting, feed control needs to be performed with various adjustments so that change in the amount of machining per unit time will be reduced to the lowest possible level to stabilize the discharge pulse density.

FIG. 11 is an illustration for explaining machining in the constant average machining voltage mode. Let us suppose that a surface of a workpiece 5 having a thickness t machined by first cutting as shown in FIG. 11 is machined at a reference voltage Vs. When the widths of portions to be removed are G(x+1) and Gx and the average machining voltages in machining those portions are V(x+1) and V(x), respectively, the distances per unit time δ(x+1) and δx that the wire electrode moves relatively to those portions are as follows:

$$\delta(x+1) = (V(x+1) - Vs) * \text{gain}$$

$$\delta x = (Vx - Vs) * \text{gain}.$$

Change in the amount of machining per unit time is expressed as $$(Gx * \delta x - G(x+1) * \delta(x+1)) * t.$$

Hence, in order to reduce the change in the amount of machining per unit time to the lowest possible level, feed should be so performed that the following equation will be satisfied:

$$Gx * \delta x = G(x+1) * \delta(x+1).$$

Thus, when the width G of a portion to be removed is small, the motion amount per unit time δ should be large, and when the width G of a portion to be removed is large, the motion amount per unit time δ should be small.

For this, it is most important that the change in voltage reflects the width of a portion to be removed more accurately. Also it is necessary to determine the gain corresponding to the change in voltage, appropriately.

Actually, change in the gap voltage is affected by factors other than the change in the amount of machining per unit distance. Specifically, when the feed control is not performed appropriately (this often happens during machining under the conventional control), the discharge pulse density becomes unstable, so that produced sludge is unevenly distributed in the gap, so that the gap voltage is more affected than it is affected by the real change in the amount of machining per unit distance. Once sludge is unevenly distributed and stays in the gap, discharge pulses are generated continuously due to the unevenly distributed sludge, which lowers the average machining voltage. As a result, the feed speed decreases, which leads to further increase in the discharge pulse density and results in so-called too much removal. When sludge is little and generates little discharge pulses, the average machining voltage increases. As a result, the feed speed increases and a so-called unmachined part remains.

As a result, irregularities such as undulation and lines are produced on the finished surface. An area which requires especially high finished surface accuracy is finished by using a small pulse current and increasing the number of times of electric discharge. In this case, since the discharge pulse density is more difficult to control, the above-mentioned tendency is stronger. Thus, in the feed control in finishing, improvement is demanded also for keeping the discharge pulse density constant.

Conventionally, in finishing, the feed control in the constant average machining voltage mode is performed generally. However, as described above, in this mode, since the change in average machining voltage cannot reflect the width of a portion to be removed sufficiently accurately, the feed does not have sufficient accuracy. Further, it is very difficult to select an appropriate gain according to the change in average machining voltage which corresponds to the change in the width of a portion to be removed. Thus, in the conventional control, stable surface accuracy cannot be obtained repeatedly, and the demand for improvement in finishing accuracy cannot be satisfied.

Also the machining in the constant feed speed mode has similar problems.

FIG. 12 is an illustration for explaining the machining in the constant feed speed mode. Let us suppose that a surface of a workpiece 5 having a thickness t machined by first cutting is finished at a speed SPD. Because of the constant feed speed mode, the distance per unit time that the wire electrode moves is constant regardless of the widths G(x+1) and Gx of portion to be removed. When this distance per unit time that the wire electrode moves is δx, the change in the amount of machining per unit time is expressed as $$(Gx - G(x+1)) * \delta x * t.$$

Hence, in the same period of time, more discharge pulses are applied to the portion having the width Gx than the portion having the width G(x+1). This leads to too high discharge pulse density, and lowers the machining accuracy.

SUMMARY OF THE INVENTION

The present invention provides a controller for a wire electric discharge machine which does not require adjustment of a gain or the like in relative feed control of a wire electrode to a workpiece, and which can achieve stable machining and high surface accuracy.

According to an aspect of the invention, a controller for a wire electric discharge machine comprises: machining rate determining means for determining rate of machining by the electric discharge between the wire electrode and the workpiece; and motion control means for controlling relative motion of the wire electrode and the workpiece based on the rate of machining determined by the machining rate determining means such that a speed of the relative motion is decreased when the rate of machining is increased.

The machining rate determining means may obtain the number of times of electric discharge in each predetermined period, and determine the rate of machining based on comparison of the obtained number of times of electric discharge with a reference number of times of electric discharge. Alternatively, the machining rate determining means may obtain a voltage drop of an average machining voltage from a preset no-load voltage in each predetermined period, and determine the rate of machining based comparison of the obtained voltage drop with a reference voltage drop.

According to another aspect of the present invention, a controller for a wire electric discharge machine comprises: voltage drop calculation means for determining a voltage drop of an average machining voltage with respect to a preset no-load voltage in each predetermined period; movement means for moving the wire electrode relative to the workpiece along a machining path according to motion commands; reference value storage means storing a predetermined value representing a voltage drop of a reference average machining voltage with respect to the preset no-load voltage; comparison means for comparing the voltage drop determined by the voltage drop calculation means and the predetermined value stored in the reference value storage means; and control means for controlling the relative motion of the wire electrode in each predetermined period by outputting the motion command to the movement means based on a result of the comparison by the comparison means.

According to still another aspect of the invention, a controller for a wire electric discharge machine comprises: voltage drop determination means for determining a voltage drop of an average machining voltage with respect to a preset no-load voltage in each predetermined period; movement means for moving the wire electrode relatively to the workpiece along a machining path according to motion commands; reference value storage means storing a predetermined value representing a voltage drop of a reference average machining voltage with respect to the preset no-load voltage; means for obtaining a ratio between the voltage drop determined by the voltage drop calculation means and the predetermined value stored in the reference value storage means; and means for obtaining a motion amount by multiplying a distance of relative motion determined by a preset feed speed and the predetermined period by the ratio, and outputting the obtained motion amount to the movement means as the motion command in each predetermined period. The ratio may be determined as a ratio of the predetermined value stored in the reference value storage means to the voltage drop determined by the voltage drop calculation means.

DETAILED DESCRIPTION

Figure 1:
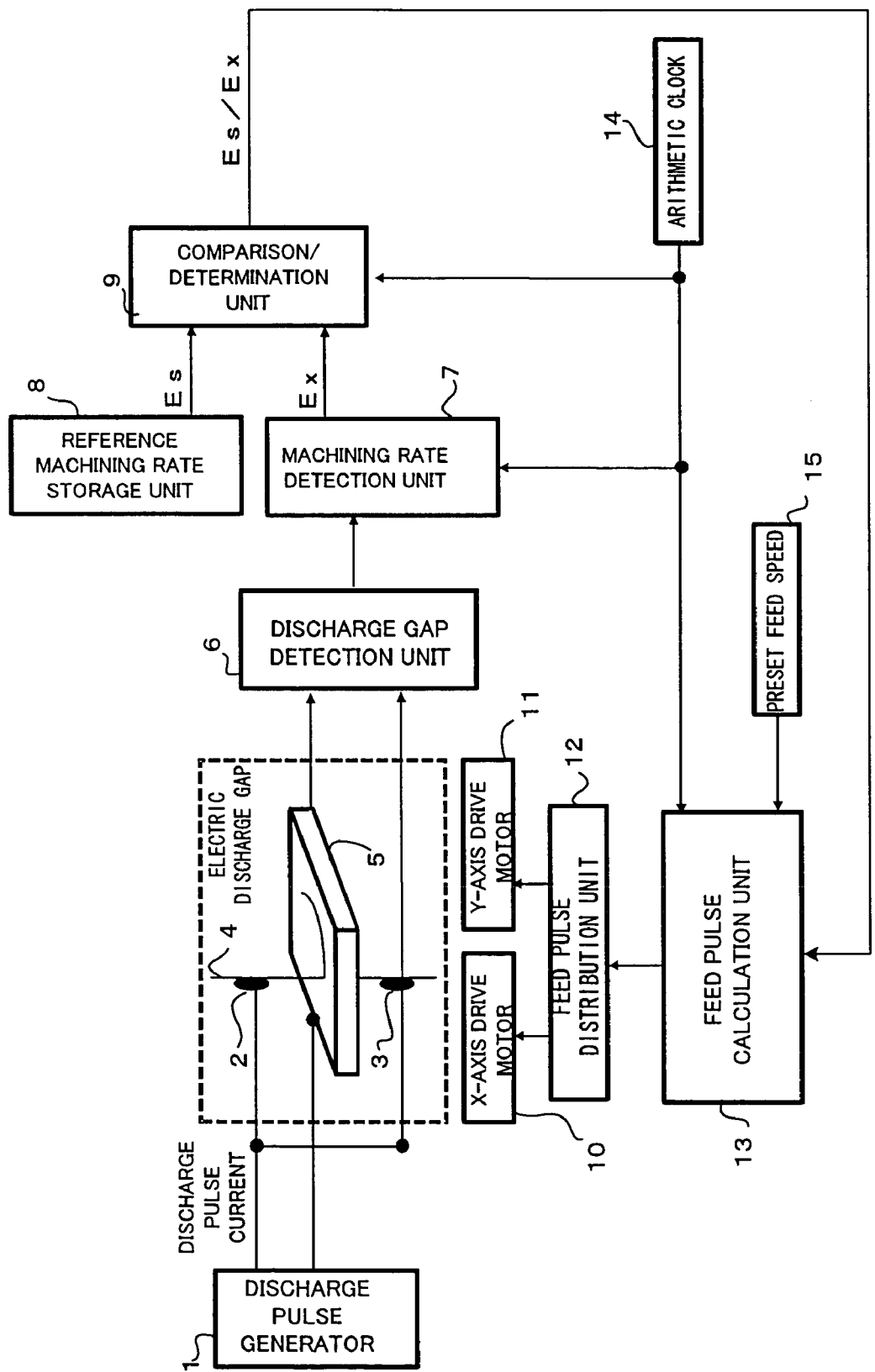
FIG. 1 is a block diagram showing relevant parts of a controller for a wire electric discharge machine according to an embodiment of the invention.

FIG. 1 is a block diagram showing relevant parts of a controller for a wire electric discharge machine according to the invention. A discharge pulse generator 1 is for applying a discharge pulse voltage to a gap between a wire electrode 4 and a workpiece 5 for electric discharge machining, and comprises a direct-current power source, a circuit including a switching element such as a transistor, a charge and discharge circuit for a capacitor, and others. Conductive brushes 2 and 3 are for making a current flow through the wire electrode, and connected to one of the two terminals of the discharge pulse generator 1. The workpiece 5 is connected to the other terminal of the discharge pulse generator 1. The discharge pulse generator 1 applies a pulse voltage between the wire electrode 4, which is traveling, and the workpiece 5. A table (not shown) on which the workpiece 5 is placed is driven by an X-axis drive motor control unit 10, a Y-axis drive motor control unit 11 and a pulse distribution unit 12.

A discharge gap detection unit 6 is connected to the wire electrode 4 and the workpiece 5. The discharge gap detection unit 6 detects a pulse-like gap voltage having a length of several microseconds or shorter from the discharge pulse generator 1 and sends the detected value to a machining rate detection unit 7. The machining rate detection unit 7 obtains an average voltage drop value Ex that is a voltage difference between a predetermined no-load voltage and an average value of the pulse-like gap voltage in a unit time (predetermined period) T, on the basis of a signal sent out from an arithmetic clock 14 in each unit time (predetermined period) T. As described later, the machining rate detection unit 7 determines a rate of machining. A reference machining rate storage unit 8 is for storing a voltage drop value Es representing a reference machining rate, which is set and stored in advance.

In the reference machining rate storage unit 8, the voltage drop value Es representing the reference machining rate is stored in advance. A comparison/determination unit 9 compares the average voltage drop value Ex obtained by the machining rate detection unit 7 in each unit time (predetermined period) T and the voltage drop value Es inputted from the reference machining rate storage unit 8, in each unit time (predetermined period) T, and outputs a ratio (Es/Ex) between the average voltage drop value Ex and the voltage drop value Es to a feed pulse calculation unit 13.

The feed pulse calculation unit 13 obtains, in response to the signal outputted from the arithmetic clock 14 in each unit time (predetermined period) T, a motion amount δx by multiplying a distance (SPD*T), which is obtained from a feed speed SPD supplied from a feed speed setting means 15 and the length of the predetermined period T, by the ratio (Es/Ex) between the average voltage drop value Ex and the voltage drop value Es representing the reference machining rate, which is outputted from the comparison/determination unit 9. The pulse calculation unit 13 sends a pulse train corresponding to the obtained motion amount δx to a feed pulse distribution unit 12. On the basis of this pulse train, the feed pulse distribution unit 12 distributes X-axis drive pulses and Y-axis drive pulses to the X-axis drive motor control unit 10 and the Y-axis drive motor control unit 11 according to machining programs to thereby drive an X-axis motor and a Y-axis motor for driving the table on which the workpiece 5 is mounted.

Figure 10:
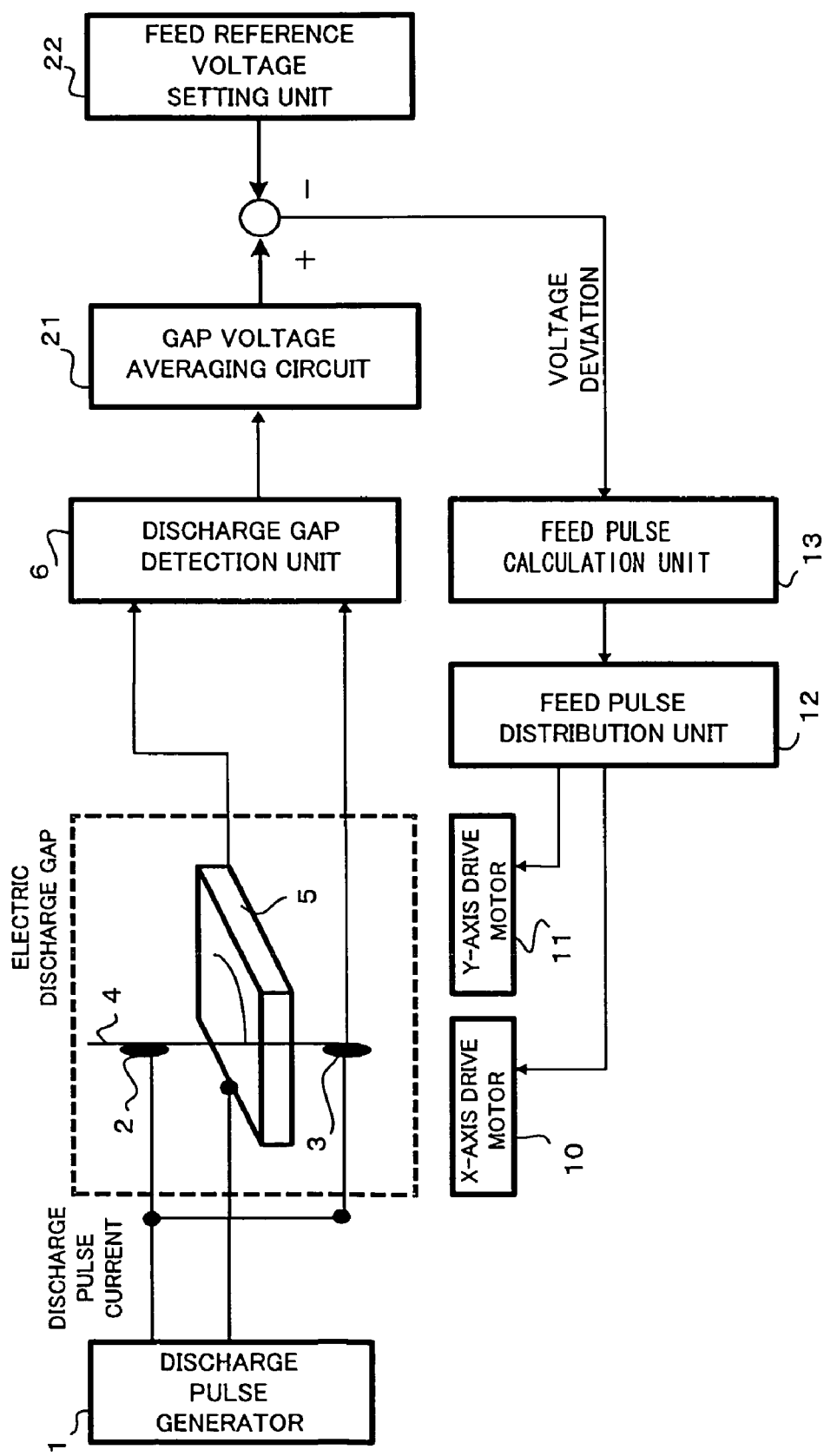
FIG. 10 is a block diagram showing relevant parts of a conventional controller for a wire electric discharge machine.
Figure 11:
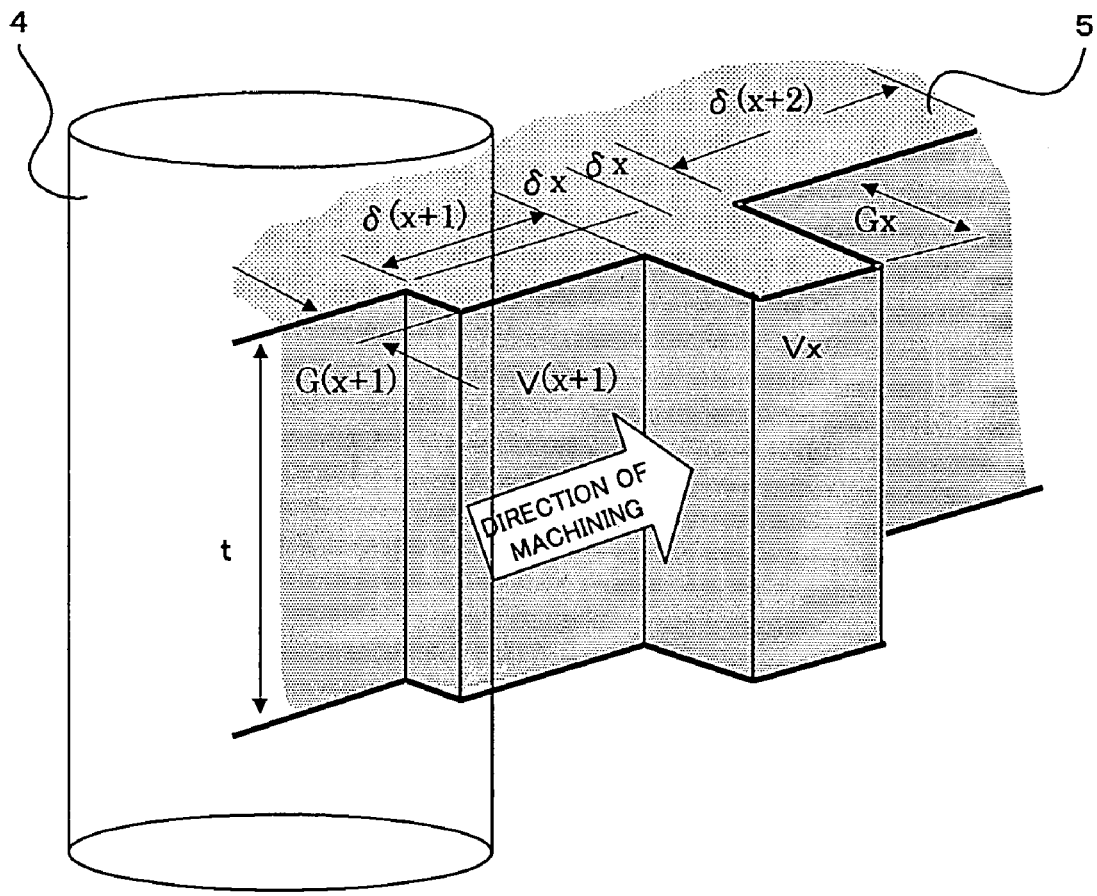
FIG. 11 is an illustration for explaining conventional feed control in a constant machining voltage control mode.
Figure 12:
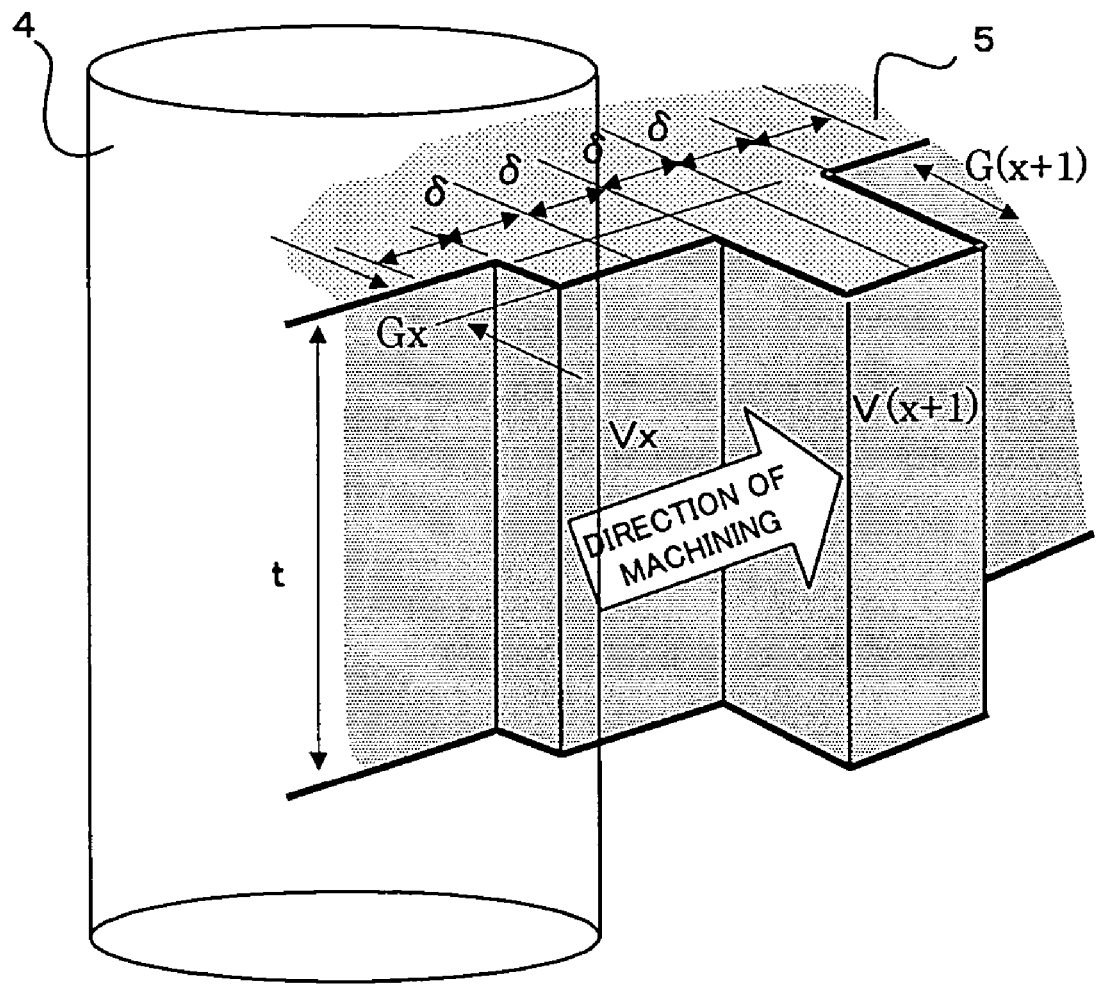
FIG. 12 is an illustration for explaining conventional feed control in a constant feed speed control mode.

As stated above, the present embodiment is different from the conventional example shown in FIG. 10 in that the feed pulse calculation unit 13 generates a pulse train based on the ratio (Es/Ex) between the average voltage drop value Ex and the reference voltage drop value Es, while in the conventional example, a pulse train is generated based on the voltage difference between the average machining voltage and the reference voltage. Because of this difference, the present embodiment can achieve stable finishing with high surface accuracy without requiring adjustment of a gain or the like.

Figure 2:
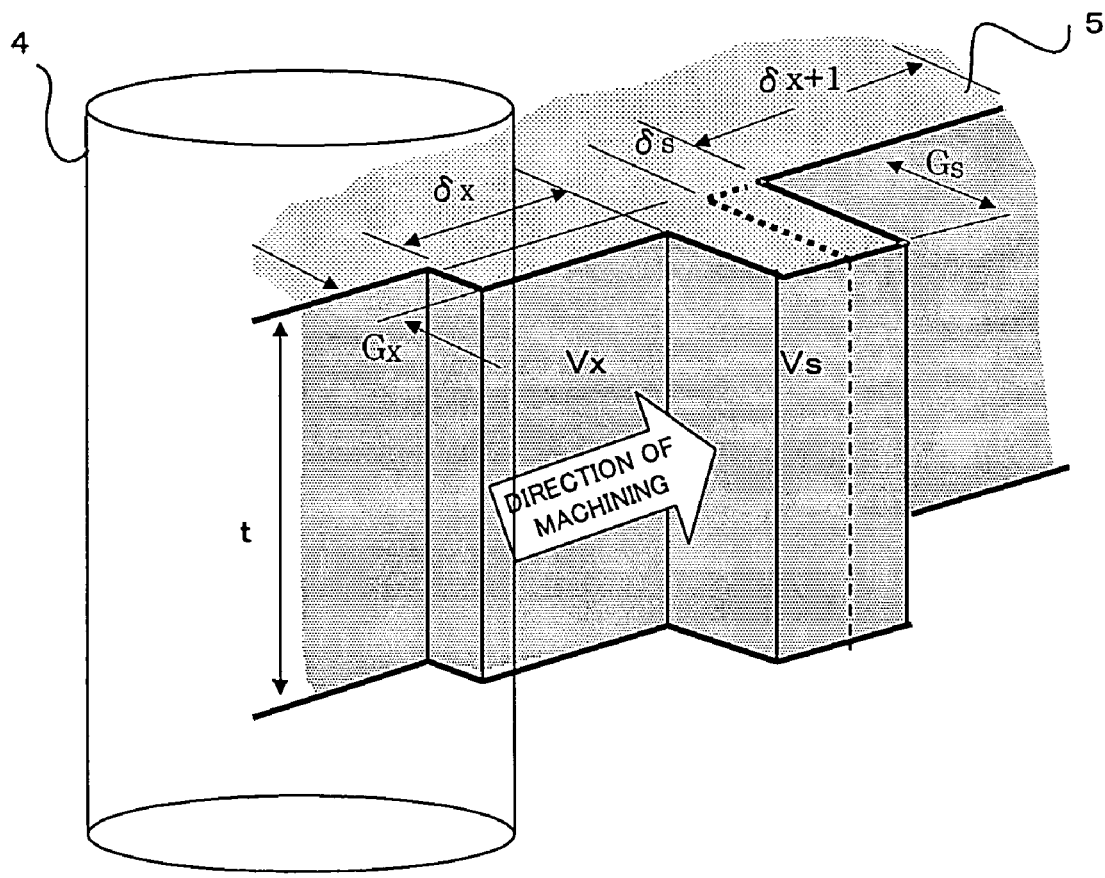
FIG. 2 is an illustration for explaining operation and function of an embodiment of the present invention.

FIG. 2 is a schematic view for showing operation and function of an embodiment in finishing for smoothing irregularities of a machined surface.

In order to attain the purpose of finishing, namely to smooth irregularities of a machined surface, the amount of feed per unit time should be changed depending on change in the width of a portion to be removed so that the amount of machining per unit time will be kept constant. In FIG. 2, provided that $t_S$ and $t_X$ are thickness of portions to be removed having widths $G_S$ and $G_X$, respectively, and $\delta_S$ and $\delta_X$ are motion amounts per unit time of the wire electrode relative to the portions having widths $G_S$ and $G_X$, respectively, the amount of feed per unit time should be controlled so that the relationship according to the following equation (1) is maintained.

$$\delta_S * t_S * G_S = \delta_X * t_X * G_X$$

$$\therefore \delta_X = \delta_S * (t_S/t_X) * (G_S/G_X) \tag{1}$$

Figure 3:
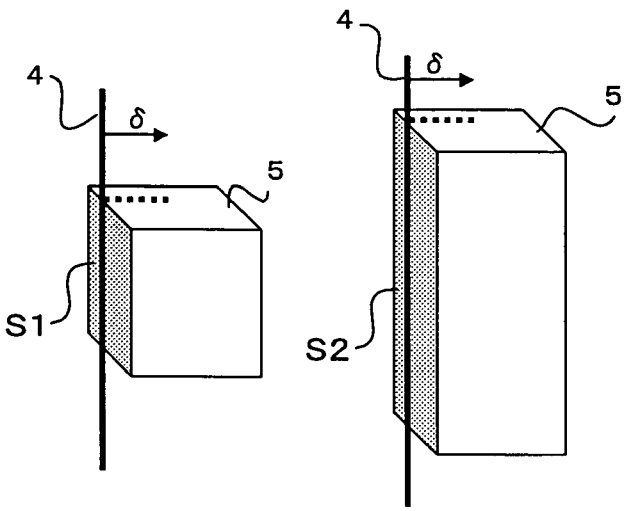
FIG. 3 is an illustration for explaining a relationship between an electric discharge area and the number of times of electric discharge.
Figure 4:
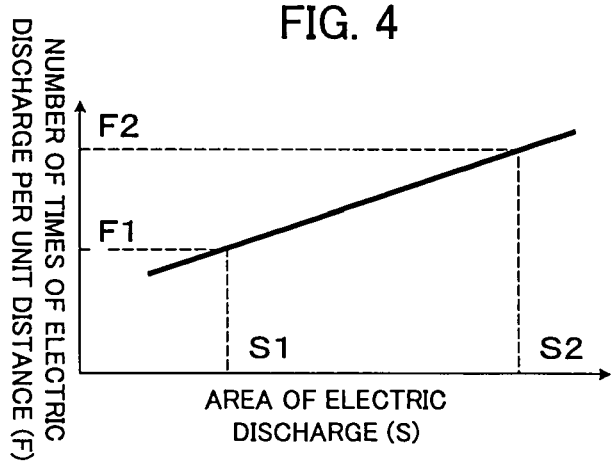
FIG. 4 is a diagram for explaining a relationship between an electric discharge area and the number of times of electric discharge.

Here, as shown in FIG. 4, electric discharge area (the area of a portion to be removed by electric discharge) S1, S2 shown in FIG. 3 is in proportion to the number of times F1, F2 of electric discharge generated while the wire electrode moves a unit distance δ relatively to the workpiece. The amount of machining per unit distance δ is equivalent to the electric discharge area S, namely the product of the thickness t and the width G. Hence, there is the following relationship between $t_S * G_S$ and $t_X * G_X$, and the numbers of times $F_S$ and $F_X$ of electric discharge.

$$(t_S * G_S)/(t_X * G_X) = K * (F_S/F_X)$$

$$\therefore (T_S/t_X) * (G_S/C_X) = K * (F_S/F_X) \tag{2}$$

K: a constant determined by machining conditions. Here, provided that $\delta_S$ is a reference motion amount per unit time, the reference motion amount per unit time $\delta_S$ is obtained from a predetermined and stored reference feed speed $SPD_S$ according to the following equation:

$$\delta_S = SPD_S * T \tag{3}$$

From the equations (1), (2) and (3), the motion amount $\delta_X$ per unit time is expressed as follows:

$$\delta_X = SPD_S * T * K * (F_S/F_X) \tag{4}$$

Since $\delta_X/T = SPD_X$, $$SPD_X = K * SPD_S * (F_S/F_X) \tag{5}$$

By changing the speed $SPD_X$ at which the wire electrode moves by the motion amount $\delta_X$ in the unit time T relatively to the portion having the width $G_X$ to be proportional to the product of the reference speed $SPD_S$ and the ratio $F_S/F_X$ between the number of times $F_S$ of electric discharge at the portion having the width $G_S$ and the number of times $F_X$ of electric discharge at the portion having the width $G_X$, the machining amount per unit time can be kept constant. This means that the speed $SPD_X$ which makes the machining amount per unit time agree with the reference machining amount per unit time can be obtained based on the ratio $F_S/F_X$ of the number of times $F_X$ of electric discharge to the reference number of times $F_S$ of electric discharge which is determined in advance. The ratio $F_S/F_X$ shows a value which is proportional to a change of the machining amount per unit time in the electric discharge machining. Thus, the feed speed is controlled so that the machining amount per unit time is kept constant in response to the change in the width of a portion to be removed.

Next, let us suppose that regarding a portion relatively to which the wire electrode moves the reference motion amount $\delta_S$ per unit time, an average no-load period is $T_{W(S)}$, regarding a portion relatively to which the wire electrode moves by the motion amount $\delta_X$ per unit time, an average no-load period is $T_{W(X)}$, a predetermined no-load voltage is $V_P$, and an off time period is $T_{OFF}$. A discharge on time $T_{ON}$ is omitted since it is very short. In this case, the average machining voltage $V_S$ regarding the former portion and the average machining voltage $V_X$ regarding the latter portion are obtained as follows:

$$V_S = VP * T_{W(S)}/(T_{W(S)} + T_{OFF}) \tag{6}$$

$$V_X = VP * T_{W(X)}/(T_{W(X)} + T_{OFF}) \tag{7}$$

In this case, the number of times $F_S$ of electric discharge at the former portion and the number of times $F_X$ of electric discharge at the latter portion are obtained as follows:

$$F_S = 1/(T_{W(S)} + T_{OFF}) \tag{8}$$

$$F_X = 1/(T_{W(X)} + T_{OFF}) \tag{9}$$

By eliminating the average no-load times $T_{W(S)}$ and $T_{W(X)}$ from the expressions (6), (7), (8) and (9), the following expressions are obtained:

$$F_S * T_{OFF} = (V_P - V_S)/V_P \tag{10}$$

$$F_X * T_{OFF} = (V_P - V_X)/V_P \tag{11}$$

When $(V_P - V_S)$ is expressed as an average voltage drop Es, $(V_P - V_X)$ is expressed as an average voltage drop $E_X$, and the expressions (10) and (11) are applied to the expression (5), the following expression is obtained:

$$SPD_X = K * SPD_S * E_S/E_X \tag{12}$$

Thus, the speed $SPD_X$ at which the wire electrode moves the motion amount $\delta_X$ per unit time is in proportion to the product of the reference speed $SPD_S$ and the ratio between the average voltage drop $E_S$ regarding the portion relatively to which the wire electrode moves the reference motion amount $\delta_S$ per unit time, and the average voltage drop $E_X$ regarding the portion relatively to which the wire electrode moves the motion amount $\delta_X$ per unit time. Thus, even when the number of times of electric discharge cannot be obtained, the same effect as that obtained depending on the number of times of electric discharge according to the expression (5) can be obtained depending on the no-load voltage and the average machining voltage. The no-load voltage is a determined voltage and known. Hence, when the average machining voltage is detected, the above-described average voltage drop $E_X$ is obtained and the ratio $(E_S/E_X)$ between the average voltage drop $E_S$ in reference machining and the average voltage drop $E_X$ is obtained, the speed $SPD_X$ which makes the amount of machining per unit time agree with the reference amount of machining per unit time can be obtained from the ratio $(E_S/E_X)$ and the speed $SPD_S$ in reference machining. Hence, feed can be so performed that the amount of machining per unit time will be kept constant, depending on change in the width of a removed portion.

In this case, the discharge gap detection unit 6 shown in FIG. 1 comprises means for detecting the voltage between the wire electrode and the workpiece, and the machining rate detection unit 7 comprises a voltage drop calculation means for obtaining the average machining voltage $V_X$ in each unit time T and obtaining the average voltage drop $E_X$ that is the difference between the no-load voltage $V_P$ and the average machining voltage $V_X$. The reference machining rate storage unit 8 constitutes reference value storage means for storing the average voltage drop $E_S$ in reference machining, and the comparison/determination unit 9 constitutes comparison means for obtaining the average voltage drop ratio, ($E_S/E_X$). The discharge gap detection unit 6, the machining rate detection unit (voltage drop calculation means) 7, the reference machining rate storage unit (reference value storage means) 8 and the comparison/determination unit (comparison means) 9 constitute machining rate determining means.

Figure 5:
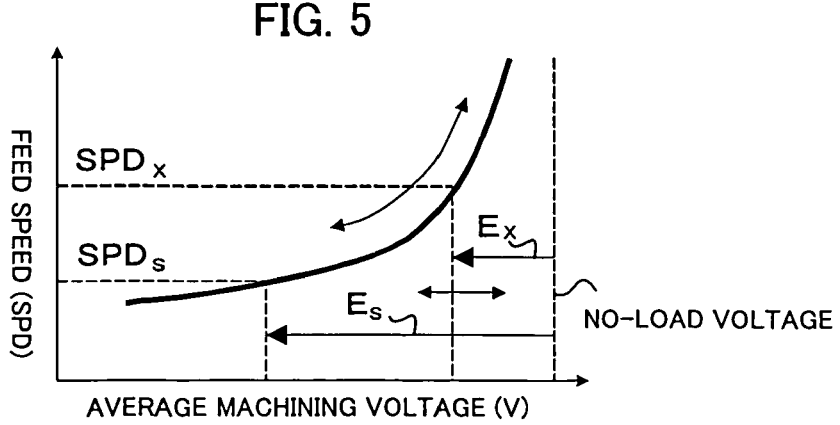
FIG. 5 is a diagram for explaining a relationship between average machining voltage and the amount of feed, in control according to an embodiment of the invention.

FIG. 5 shows the relationship expressed by the expression (12), where the feed speed SPD and the average machining voltage are plotted on the ordinate and the abscissa, respectively. This shows that when the reference average voltage drop $E_S$ and the reference feed speed $SPD_S$ are predetermined as shown by a dotted line, the speed $SPD_X$ can be generated by obtaining the average, voltage drop $E_X$ in each unit time T which constantly changes during machining.

Figure 6:
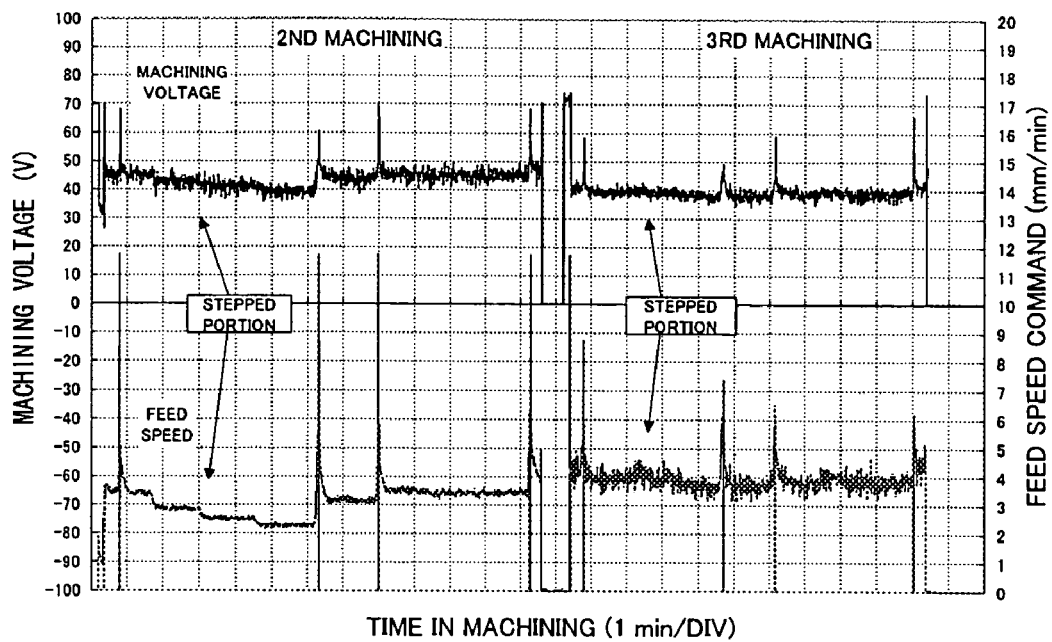
FIG. 6 is a diagram showing the waveform of machining voltage and the waveform of feed speed obtained by monitoring in an experimental example where second cutting and third cutting were performed on a stepped machined surface of a workpiece, under finishing feed control to which an embodiment was applied.
Figure 7:
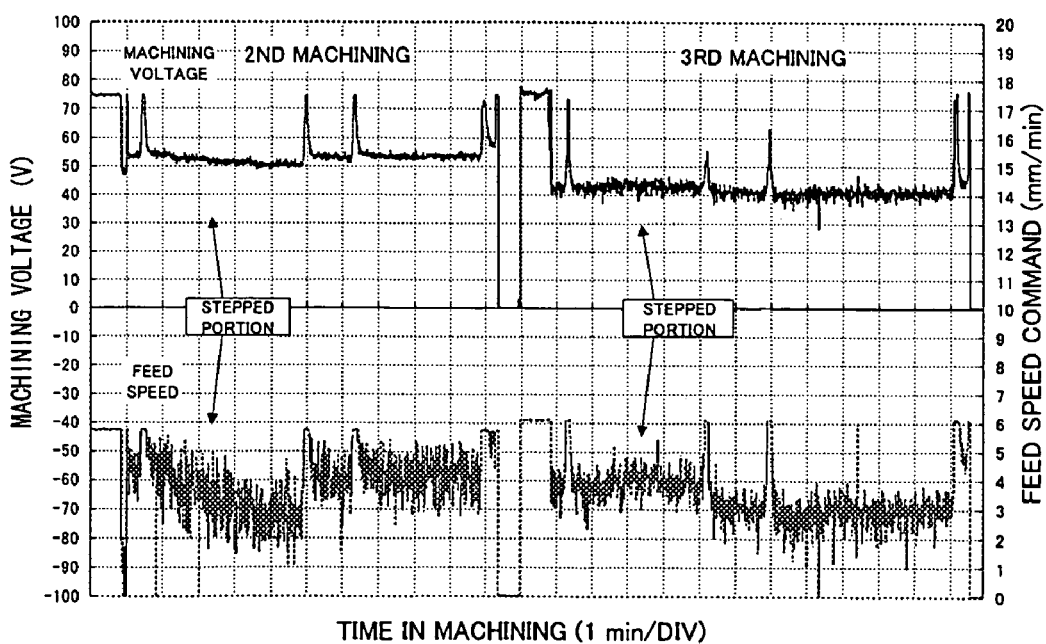
FIG. 7 is a diagram showing the waveform of machining voltage and the waveform of feed speed obtained by monitoring in the case where second cutting and third cutting were performed on the same workpiece under conventional control in a constant machining voltage mode.
Figure 8:
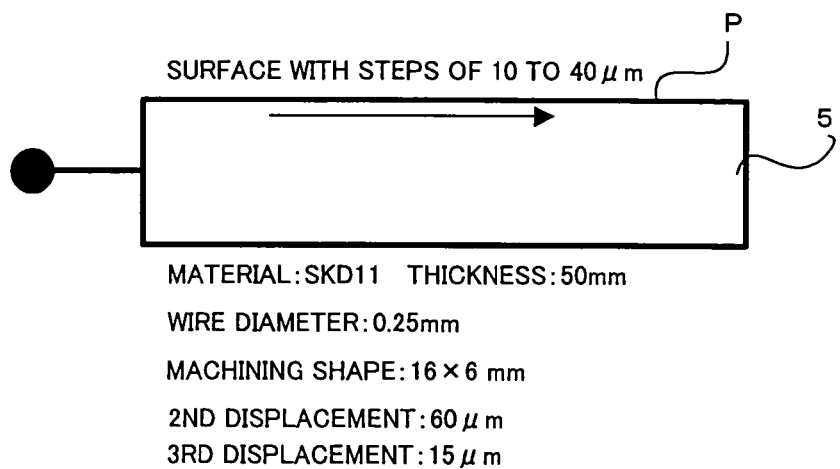
FIG. 8 is an illustration for explaining the workpiece used in the experimental example.
Figure 9:
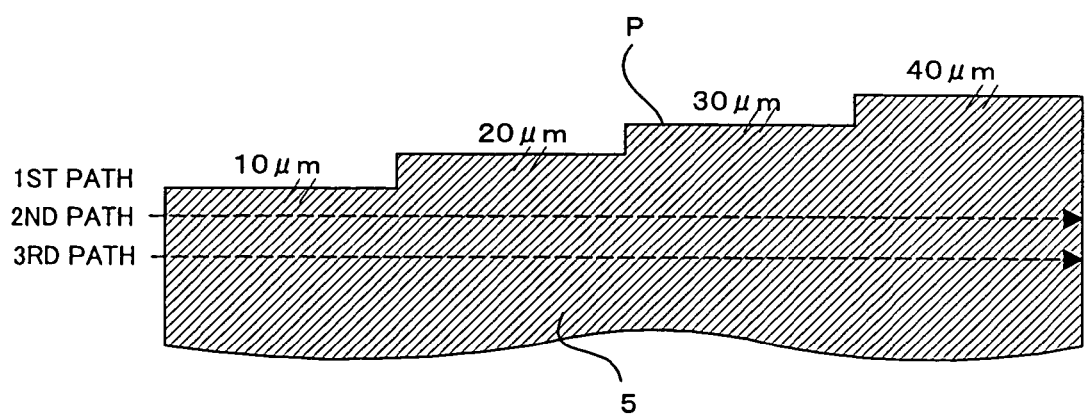
FIG. 9 is an enlarged illustration showing the stepped machined surface of the workpiece used in the experimental example.

FIG. 6 is the result obtained by monitoring second cutting and third cutting under the finishing feed control according to the present invention. In this machining, a workpiece (punch) of a material SKD11 having a rectangular shape of 16×6 mm and a thickness of 50 mm, and having a surface with steps of 10 μm, 20 μm, 30 μm and 40 μm on an upper side indicated by a line P in FIG. 8 was formed by first cutting (FIG. 9 shows the stepped part on an enlarged scale). As shown in FIG. 9, in the second cutting, finishing was performed along the machining path displaced by 60 μm, and in the third cutting, finishing was performed along the machining path further displaced by 15 μm, to thereby make the stepped surface formed by the first cutting into a flat surface. The form accuracy, straightness accuracy and surface roughness of the finished surface was measured. FIG. 7 is the result obtained by monitoring similar machining tried under the conventional control. Table 1 shows the results of each machining.

TABLE 1

|  | Machining according to the invention | Machining under conventional control |
|---|---|---|
| Straightness accuracy: mm | 0.003 | 0.005 |
| Shape accuracy: mm | 0.003 | 0.005 |
| Surface roughness: μmRy | 3.20 | 4.00 |

In the conventional control shown in FIG. 7, the control is so performed that the machining voltage will be kept constant. Thus, the value of the feed speed command frequently repeats increase and decrease, according to how the voltage appears, to a degree larger than the actual height difference between the steps (This tendency is especially prominent in the second cutting). In contrast, in the control according to the present invention shown in FIG. 6, the feed control command appropriately corresponding to the actual height difference between the steps is generated, and stable machining is achieved. The measurement result shown in Table 1 shows that the control according to the present invention produced better results in accuracy as well as surface roughness than the conventional control.

In the above-described embodiment, the amount of machining per unit distance is obtained on the basis of the voltage drop that is the voltage difference between the gap voltage between the wire electrode 4 and the workpiece 5 and the no-load voltage. However, as stated above, the amount of machining per unit distance can be obtained on the basis of the number of times of electric discharge which is obtained from the gap voltage or the like, and using the amount of machining per unit distance obtained this way, control can be performed so that the amount of machining per unit time will be kept constant. In this case, the discharge gap detection unit 6 shown in FIG. 1 is formed of means for detecting electric discharge, the machining rate detection unit 7 is formed of means for obtaining the number of times of electric discharge occurring in the unit time T, namely the number of times of electric discharge $F_X$, and the reference machining rate storage unit 8 is means for storing the number of times of electric discharge $F_S$ occurring in machining the reference amount of machining. The comparison/determination unit 9 is formed of means for obtaining the ratio ($F_S/F_X$) between the numbers of times of electric discharge $F_S$ and $F_X$.

In the present invention, in finishing, feed can be so performed that the amount of machining per unit time will be kept constant, depending on change in the width of a portion to be removed. Hence, cumbersome adjustment such as gain adjustment is no longer required. Also, an appropriate feed speed can be obtained, depending on change in the width of a portion to be removed. Further, stable machining can be performed, and high surface accuracy can be achieved.

What is claimed is:

1. A controller for a wire electric discharge machine for performing electric discharge machining by generating electric discharge between a wire electrode and a workpiece while relatively moving the wire electrode and the workpiece, said controller comprising:
   machining rate determining means for determining rate of machining by the electric discharge between the wire electrode and the workpiece; and
   motion control means for controlling relative motion of the wire electrode and the workpiece based on the rate of machining determined by said machining rate determining means such that a speed of the relative motion is decreased when the rate of machining is increased.

2. A controller for the wire electric discharge machine according to claim 1, wherein said machining rate determining means obtains the number of times of electric discharge in each predetermined period, and determines the rate of machining based on comparison of the obtained number of times of electric discharge with a reference number of times of electric discharge.

3. A controller for the wire electric discharge machine according to claim 1, wherein said machining rate determining means obtains a voltage drop of an average machining voltage from a preset no-load voltage in each predetermined period, and determines the rate of machining based on comparison of the obtained voltage drop with a reference voltage drop.

4. A controller for a wire electric discharge machine for performing electric machining by generating electric discharge between a wire electrode and a workpiece while relatively moving the wire electrode and the workpiece to each other, said controller comprising:
   voltage drop calculation means for determining a voltage drop of an average machining voltage with respect to a preset no-load voltage in each predetermined period;
   movement means for moving the wire electrode relative to the workpiece along a machining path according to motion commands;
   reference value storage means storing a predetermined value representing a voltage drop of a reference average machining voltage with respect to the preset no-load voltage;

comparison means for comparing the voltage drop determined by said voltage drop calculation means and the predetermined value stored in said reference value storage means; and control means for controlling the relative motion of the wire electrode in each predetermined period by outputting the motion command to said movement means based on a result of the comparison by said comparison means.

5. A controller for a wire electric discharge machine for performing electric machining by generating electric discharge between a wire electrode and a workpiece while relatively moving the wire electrode and the workpiece to each other, said controller comprising:

voltage drop determination means for determining a voltage drop of an average machining voltage with respect to a preset no-load voltage in each predetermined period;

movement means for moving the wire electrode relatively to the workpiece along a machining path according to motion commands;

reference value storage means storing a predetermined value representing a voltage drop of a reference average machining voltage with respect to the preset no-load voltage;

means for obtaining a ratio between the voltage drop determined by said voltage drop determination means and the predetermined value stored in said reference value storage means; and means for obtaining a motion amount by multiplying a distance of relative motion determined by a preset feed speed and the predetermined period by said ratio, and outputting the obtained motion amount to the movement means as the motion command in each predetermined period.

6. A controller for the wire electric discharge machine according to claim 5, wherein said ratio is determined as a ratio of the predetermined value stored in said reference value storage means to the voltage drop determined by said voltage drop determination means.

7. A controller of a wire electric discharge machine to perform electric discharge machining by generating electric discharge between a wire electrode and a workpiece while relatively moving the wire electrode and the workpiece, said controller comprising:

a machining rate determining part to determine a rate of machining by the electric discharge between the wire electrode and the workpiece; and a motion control part to control relative motion of the wire electrode and the workpiece based on the rate of machining determined by said machining rate determining part such that a speed of the relative motion is decreased when the rate of machining is increased.

8. A controller of the wire electric discharge machine according to claim 7, wherein said machining rate determining part obtains the number of times of electric discharge in each predetermined period, and determines the rate of machining based on comparison of the obtained number of times of electric discharge with a reference number of times of electric discharge.

9. A controller of the wire electric discharge machine according to claim 7, wherein said machining rate determining part obtains a voltage drop of an average machining voltage from a preset no-load voltage in each predetermined period, and determines the rate of machining based on comparison of the obtained voltage drop with a reference voltage drop.

10. A controller of a wire electric discharge machine to perform electric machining by generating electric discharge between a wire electrode and a workpiece while relatively moving the wire electrode and the workpiece to each other, said controller comprising:

a voltage drop calculator to determine a voltage drop of an average machining voltage with respect to a preset no-load voltage in each predetermined period;

a movement part to move the wire electrode relative to the workpiece along a machining path according to motion commands;

reference value storage storing a predetermined value representing a voltage drop of a reference average machining voltage with respect to the preset no-load voltage;

a comparison part to compare the voltage drop determined by said voltage drop calculator and the predetermined value stored in said reference value storage; and a controller to control the relative motion of the wire electrode in each predetermined period by outputting the motion command to said movement part based on a result of the comparison by said comparison part.

11. A controller of a wire electric discharge machine to perform electric machining by generating electric discharge between a wire electrode and a workpiece while relatively moving the wire electrode and the workpiece to each other, said controller comprising:

a voltage drop determination part to determine a voltage drop of an average machining voltage with respect to a preset no-load voltage in each predetermined period;

a movement part to move the wire electrode relatively to the workpiece along a machining path according to motion commands;

a reference value storage storing a predetermined value representing a voltage drop of a reference average machining voltage with respect to the preset no-load voltage;

a ratio calculator to obtain a ratio between the voltage drop determined by said voltage drop determination part and the predetermined value stored in said reference value storage; and a motion calculator to obtain a motion amount by multiplying a distance of relative motion determined by a preset feed speed and the predetermined period by said ratio, and outputting the obtained motion amount to the movement part as the motion command in each predetermined period.

12. A controller of the wire electric discharge machine according to claim 11, wherein said ratio is determined as a ratio of the predetermined value stored in said reference value storage to the voltage drop determined by said voltage drop determination part.

* * * * *

UNITED STATES PATENT AND TRADEMARK OFFICE
CERTIFICATE OF CORRECTION

PATENT NO. : 7,039,490 B2  Page 1 of 1
APPLICATION NO. : 10/803117
DATED : May 2, 2006
INVENTOR(S) : Masaki Kurihara et al.

It is certified that error appears in the above-identified patent and that said Letters Patent is hereby corrected as shown below:

On the cover page, item (56) References Cited, Foreign patent Documents:

Column 2, line 2, after "JP 62-292317 12/1987" insert --JP 2002-254250 10/2002--

Column 2. line 3, after "JP 62-292317 12/1987" insert --JP 32-31567 06/1996--

In the specification:

Column 2, line 14, change "feted" to --feed--

Column 2, line 27, change "set-at" to --set at--

Column 8, line 66, change "$E_x$" to --Ex--

Column 9, line 3, change "$E_s$" to --Es--

Signed and Sealed this

Nineteenth Day of September, 2006

JON W. DUDAS
*Director of the United States Patent and Trademark Office*